United States Patent

Wang

[11] Patent Number: 5,179,590
[45] Date of Patent: Jan. 12, 1993

[54] MOBILE TELEPHONE RACK ASSEMBLY

[76] Inventor: Fore S. Wang, No. 174, Lane 131, Sec. 2 True Hsing Rd., Panchiao, Taipei, Taiwan

[21] Appl. No.: 744,535

[22] Filed: Aug. 13, 1991

[51] Int. Cl.⁵ .......................... H04M 1/00; B60R 7/00
[52] U.S. Cl. .................................. 379/454; 379/446; 224/42.42
[58] Field of Search ............... 379/454, 446, 447, 449, 379/450, 455, 457; 381/86, 87; 248/309.1; 224/273, 42.42, 42.43, 42.44, 42.45 R

[56] References Cited

U.S. PATENT DOCUMENTS

| | | | |
|---|---|---|---|
| 2,518,538 | 8/1950 | Giblin | 224/42.42 R |
| 4,619,386 | 10/1986 | Richardson | 224/42.42 |
| 5,033,709 | 7/1991 | Yuen | 224/42.45 R |
| 5,037,162 | 8/1991 | Ransom | 224/42.45 R |

*Primary Examiner*—James L. Dwyer
*Assistant Examiner*—Jack Chiang
*Attorney, Agent, or Firm*—Buchnam and Archer

[57] ABSTRACT

A mobile telephone rack assembly comprising a telephone rack for holding a mobile telephone, a support securing the telephone rack to a motor vehicle's instrument board, a wall plate for mounting the telephone rack on a wall, and a suction disc for mounting the telephone rack on a window glass. The telephone rack has a first socket with an electric heating coil fastened therein and electrically connected to a second socket on a motor vehicle's instrument board by the support for lighting cigarettes.

1 Claim, 2 Drawing Sheets

MOBILE TELEPHONE RACK ASSEMBLY

BACKGROUND OF THE INVENTION

The present invention relates to telephone racks and relates more particularly to a mobile telephone rack assembly which can be alternatively set into various forms for fastening in a motor vehicle's instrument board or mounting on a wall surface or a window glass.

Mobile telephone is very convenient for conveying speech over distances while one a driving a car, walking on the road or going aboard of a ship, a train or a plane. Using a mobile telephone in a motor vehicle, a telephone rack is generally required for holding it in place. Regular telephone racks for holding mobile telephones are not satisfactory in use because they can not firmly retain a mobile telephone in place.

The present invention has been accomplished to provide a telephone rack assembly specifically designed for holding a mobile telephone in place. According to the present invention, a mobile telephone can be held in the instrument board, the window glass or any flat wall surface inside a motor vehicle.

DETAILED DESCRIPTION OF THE PREFERRED EMBODIMENT

Figure 1:
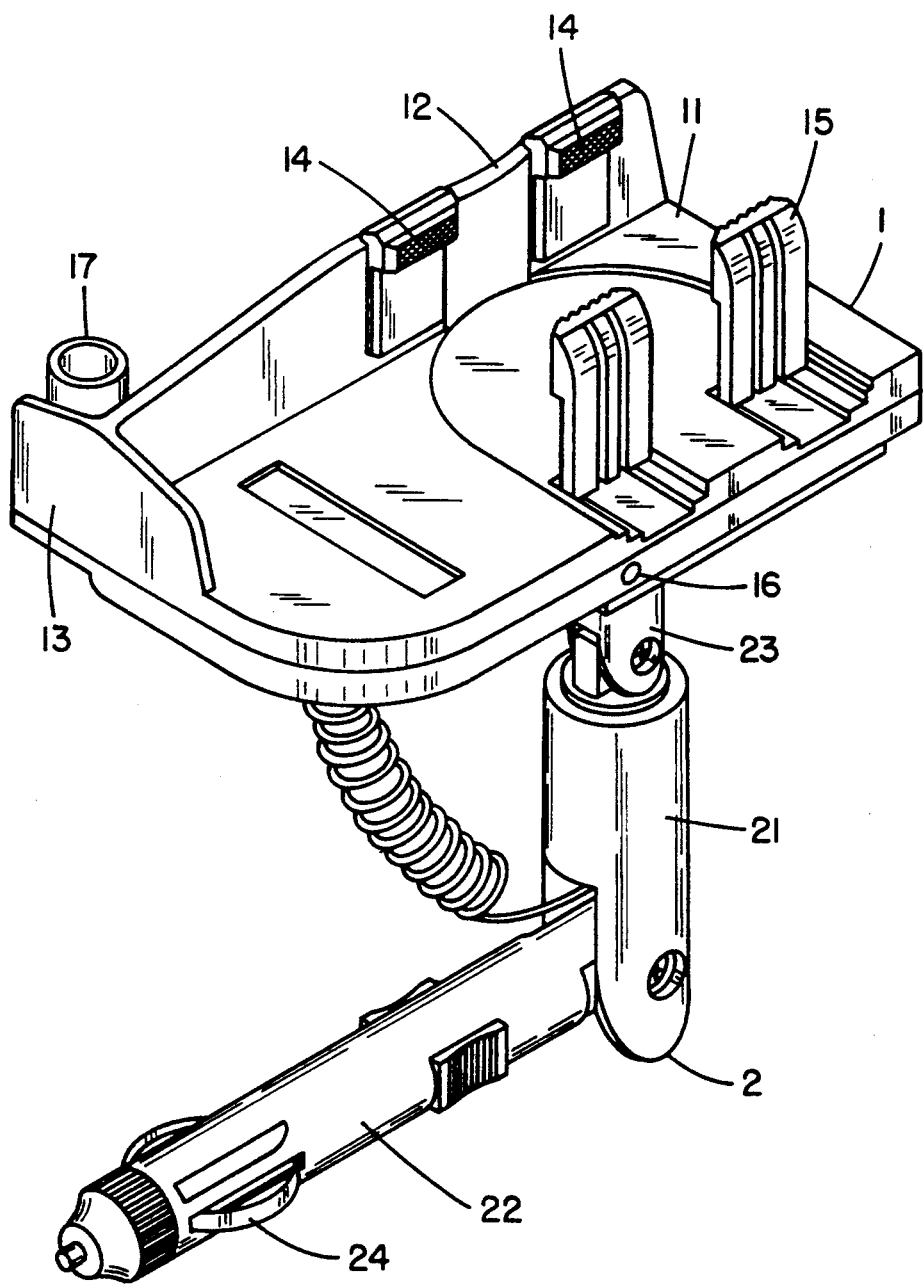
FIG. 1 is a perspective view of a mobile telephone rack assembly embodying the present invention, in which a support is used to fasten the telephone rack thereof in the socket on a motor vehicle's instrument board.
Figure 2:
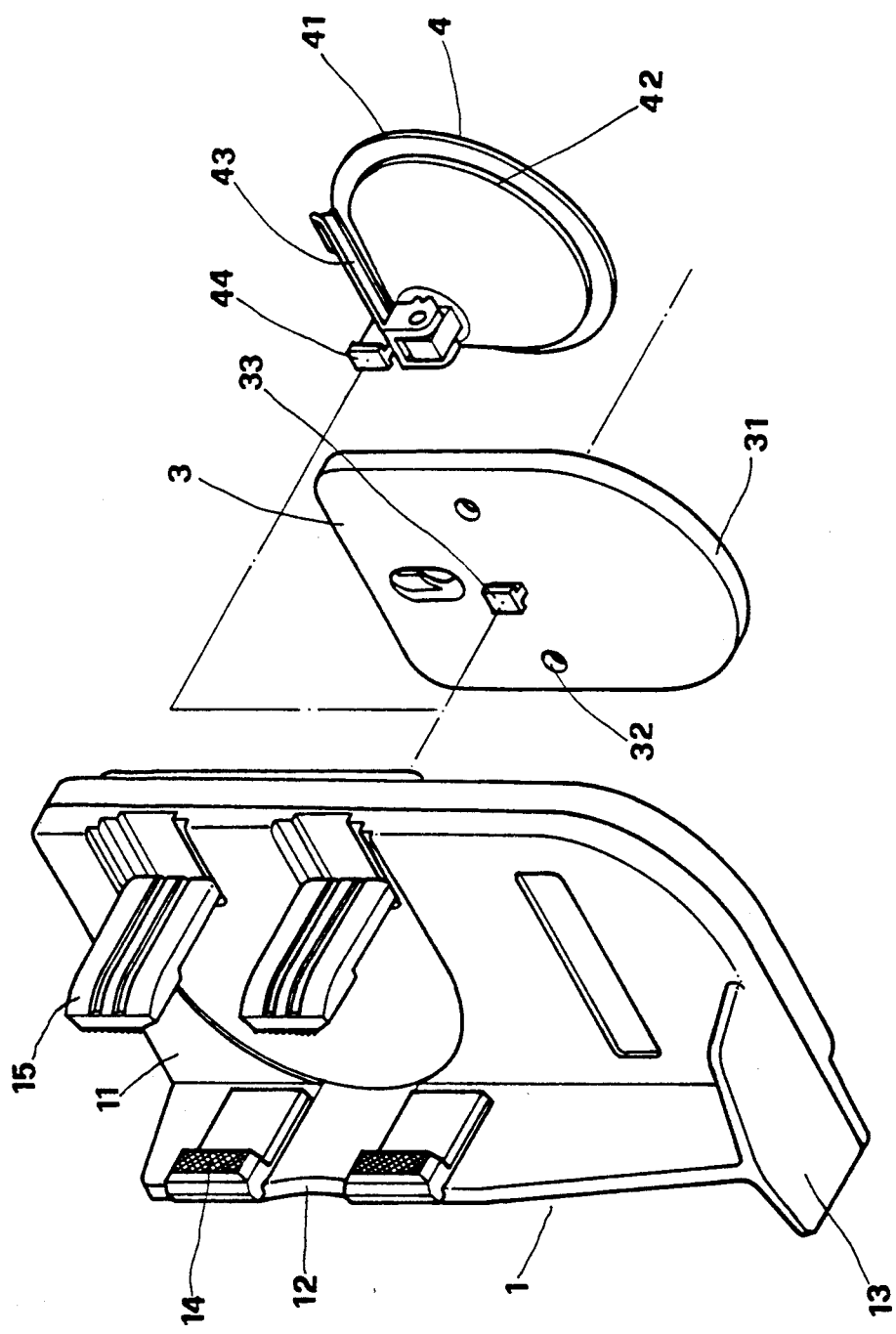
FIG. 2 is an exploded perspective view of the present invention showing that a wall plate and a suction disc can be alternatively attached to the telephone rack for mounting on a flat wall surface or a window glass.

Referring to the annexed drawings in detail, a mobile telephone rack assembly is shown and generally comprised of a telephone rack 1, a support 2, a wall plate 3, and a suction disc 4.

The telephone rack 1 comprises a base 11 having a vertical side wall 12 upstanding therefrom at one side, which vertical side wall 12 is terminated in a rib 13 at one end at right angle, a first set of parallel, embossed jaw plates 14 formed on said vertical side wall 12 at an inner side, a second set of parallel, embossed jaw plates 15 upstanding therefrom at an opposite side opposed to said first set of parallel, embossed jaw plates 14, a shaped mounting hole 16 on the bottom edge thereof (not shown), and a socket 17 vertically disposed at one corner with an electric heating coil fastened therein (not shown). The second set of parallel jaw plates 15 each is made from an elastic resilient material or incorporated with a spring means at the bottom so that they can be bent outwards for inserting a mobile telephone and then return to original shape for holding the mobile telephone in place.

The support 2 comprises a main rod 21 pivoted to a connecting rod 22. The main rod 21 is revolvably fastened in the mounting hole 16 by a joint 23. The connecting rod 22 has two arc-shaped expansion strip 24 at two opposite locations adjacent to the front end thereof and an electric circuit connected to the electric heating coil in the socket 17 on the telephone rack 1. By inserting the connecting rod 22 in the socket on a motor vehicle's instrument board, the socket 17 is electrically connected to serve as a cigarette lighter.

The wall plate 3 is made from a flat plate 31 having a plurality of holes 32 for inserting screws and a tenon 33 at the center made in size and shape suitable for fastening in the mounting hole 16 on the telephone rack 1.

The suction disc 4 is comprised of a diaphragm 42 having a rubber ring 41 attached thereto around the peripheral edge thereof and controlled to operate by a hand lever 43, and a tenon 44 made in size and shape suitable for fastening in the mounting hole 16 on the telephone rack 1.

Referring to the annexed drawings again, the telephone rack 1 can be alternatively connected to the support 2, the wall plate 3 or the suction disc 4 for mounting on the instrument board, a wall surface or a window glass. When the support 2 is attached to the telephone rack 1, the connecting rod 22 can be inserted in the socket on a motor vehicle's instrument board to hold the telephone rack 1 in place, and therefore, a mobile telephone can be held in the telephone rack and firmly retained by the two sets of jaw plates 14, 15. At the same time, the socket 17 is electrically connected to the electric circuit of the motor vehicle for use as a cigarette lighter.

In an alternate form of the present invention, the suction disc 4 is attached to the telephone rack 1 by inserting the tenon 44 in the mounting hole 16. Through the control of the hand lever 43, the suction disc 4 can be attached to the surface of a window glass to hold the telephone rack 1 thereto, and therefore, a mobile telephone can be retained in the base 11 by the jaw plates 14, 15.

In another alternate form of the present invention, the wall plate 3 can be fastened in a flat wall surface by screws, and then, the telephone rack 1 can be attached to the wall plate 3 by engaging the tenon 33 in the mounting hole 16, and therefore, a mobile telephone can be retained in the base 11 by the jaw plates 14, 15.

What is claimed is:

1. A kit of a mobile telephone rack assembly comprising:

a telephone rack for holding a mobile telephone, said telephone rack comprising a base having a vertical side wall upstanding therefrom at one side, said vertical side wall terminating in a rib at one end at right angle, a first set of parallel, embossed jaw plates formed on said vertical side wall at an inner side, a second set of parallel, embossed jaw plates upstanding therefrom at an opposite side opposed to said first set of parallel, said embossed jaw plates for holding a mobile telephone therebetween, a mounting orifice on the bottom edge thereof, and a first socket vertically disposed at one corner with an electric heating coil fastened therein for lighting cigarettes;

said kit further comprising a support to secure said telephone rack to a motor vehicle's instrument board, said instrument's board having a second socket, said support comprising a first rod and a connecting rod, said first rod being pivoted to said connecting rod at the rear end of said connecting rod, said first rod being coupled with a universal joint for fastening in said mounting orifice on said telephone rack, said connecting rod being adapted at the front end thereof to fasten in said second socket on a motor vehicle's instrument whereby said electric heating coil is electrically connected for lighting cigarettes, said connecting rod having two arc-shaped expansion strips at two opposite locations adjacent to the front end thereof;

or a wall plate to secure said telephone rack to a flat wall surface, said wall plate having a plurality of holes for fastening in a flat wall surface by screws and a tenon made at the center for fastening in said mounting orifice on said telephone rack;

or a suction disc to secure said telephone rack to a window glass, said suction disc comprising a diaphragm having a rubber ring attached thereto around the peripheral edge thereof and controlled to operate by a hand lever attached thereto at the top, and a tenon for fastening in said mounting orifice on said telephone rack.

* * * * *